United States Patent [19]

Vilutis

[11] Patent Number: 4,539,236
[45] Date of Patent: Sep. 3, 1985

[54] LAMINATED MULTI-LAYERED FILM ENCLOSURES

[75] Inventor: Leonard J. Vilutis, Frankfort, Ill.

[73] Assignee: Vilutis & Co., Inc., Frankfort, Ill.

[21] Appl. No.: 574,017

[22] Filed: Jan. 26, 1984

Related U.S. Application Data

[62] Division of Ser. No. 326,701, Dec. 2, 1981, Pat. No. 4,450,028.

[51] Int. Cl.³ .................... B32B 31/26; B29C 17/00
[52] U.S. Cl. .................... 428/35; 383/116; 383/121; 156/198; 156/244.13; 156/308.4; 493/189; 493/193
[58] Field of Search .............. 428/35, 36; 383/116, 383/121; 156/198, 244.13, 308.4; 493/189, 193

[56] References Cited

U.S. PATENT DOCUMENTS

| | | | |
|---|---|---|---|
| 3,031,332 | 4/1962 | Rothacker | 428/518 |
| 3,122,297 | 2/1964 | Sachs | 493/189 |
| 3,204,825 | 9/1965 | Underwood | 229/55 |
| 3,329,549 | 7/1967 | Vilutis | 156/273.1 |
| 3,519,513 | 7/1970 | Wilharm | 156/308.2 |
| 3,743,562 | 7/1973 | Phipps | 156/64 |
| 3,939,972 | 2/1976 | Mayworm | 206/219 |

Primary Examiner—John E. Kittle
Assistant Examiner—James J. Seidleck
Attorney, Agent, or Firm—Lockwood, Alex, Fitzgibbon & Cummings

[57] ABSTRACT

Multi-layered enclosures are provided which include extruded tubing laminated between two extruded sheets of coextruded film in order to rapidly produce an unusually tough enclosure having longitudinal side walls that are free of internal seams while providing superior fluid barrier properties. When desired, the multi-layered enclosure is transformed into a multi-layered bag or pouch by sealing the multi-layered enclosure together along one or more locations interconnecting the longitudinal or side edges of the multi-layered enclosure to thereby cross seal together the sheets, the tubing, and the internal surfaces of the tubing.

20 Claims, 9 Drawing Figures

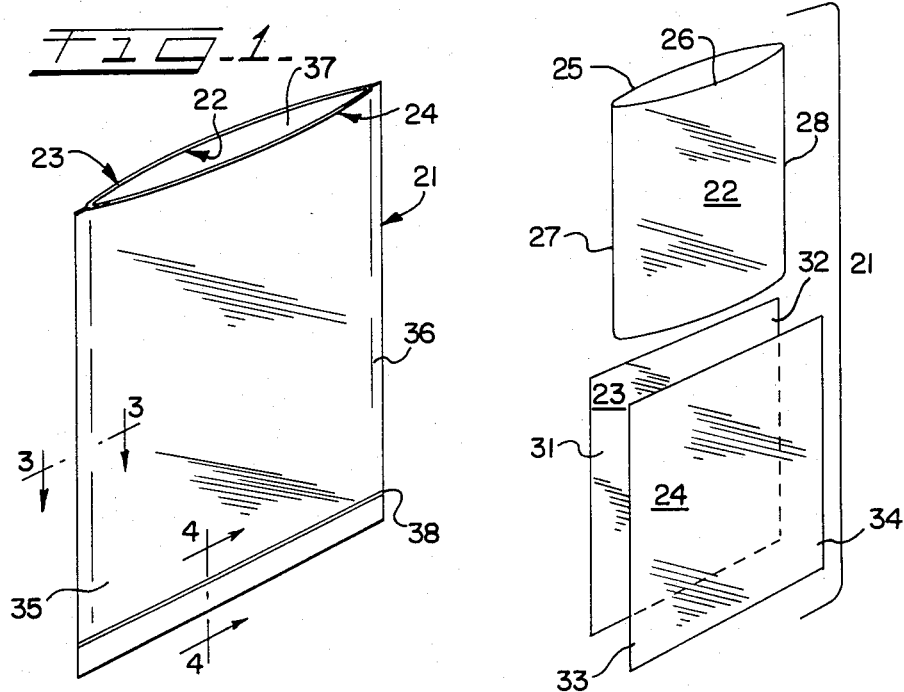
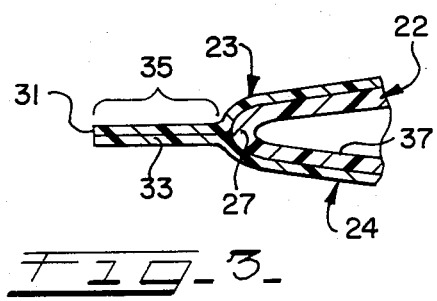
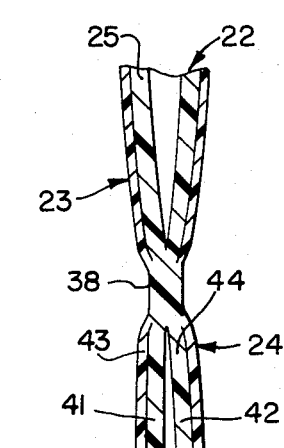

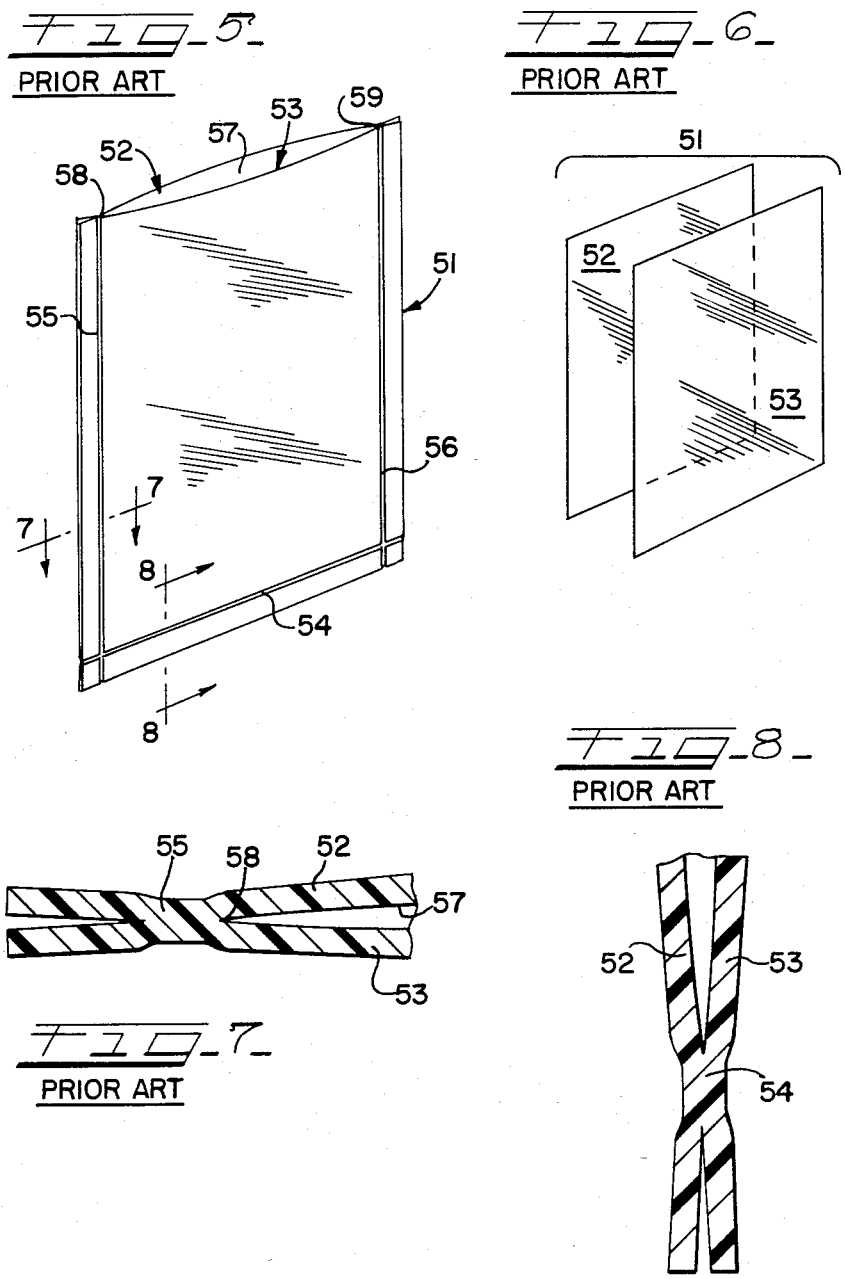

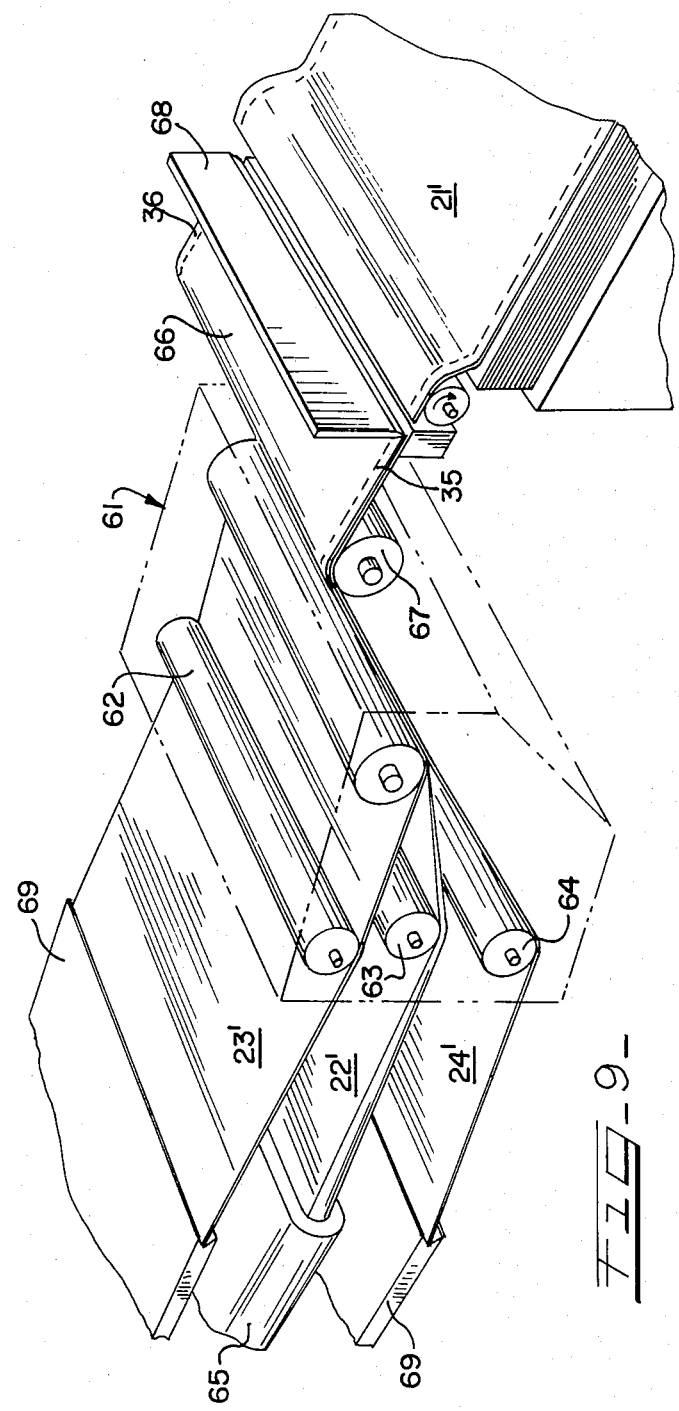

LAMINATED MULTI-LAYERED FILM ENCLOSURES

This is a division of application Ser. No. 326,701 filed Dec. 2, 1981, now U.S. Pat. No. 4,450,028.

BACKGROUND AND DESCRIPTION OF THE INVENTION

This invention generally relates to enclosures including multiple layers of flexible film, more particularly to multi-layered enclosures that laminate multiple sheets of film together into a single multi-layered enclosure suitable for use as a pouch or bag, and to the method of producing same. The multi-layered enclosures of this invention are particularly well suited for use as oversized or large capacity bags that are exceptionally tough yet provide superior fluid barrier properties.

In certain instances where film enclosures are utilized, it is especially important that the enclosures be not only exceptionally strong but also that they exhibit superior fluid barrier properties in order to attain a tough enclosure that provides an unusually long and stable shelf life. Substantial difficulties are encountered when attempting to combine these properties, particularly when they are to be provided in an oversized enclosure.

In the past, when attempting to produce multiplelayered enclosures in which two or more individually formed films are combined into a multi-layered enclosure, certain difficulties have been encountered. One difficulty is that the individual films must be sealed together at their edges, most typically by heat sealing devices. When used herein, the term "sealing" refers to bonding film layers together by a procedure that applies enough energy to the films so as to significantly alter the structure of the films. Typical energy sources include those that are thermal, ultrasonic and/or impulse. Thermal sealing, for example, typically utilizes a heated bar to transform thermoplastic films to their molten state to the extent that the molten material from one thermoplastic film combines with the molten portion of the other thermoplastic film to form a seal line having a thickness less than the combined thicknesses of the films prior to heating. Such reduced thickness weakens the overall strength of the films at the seal, and such strength deterioration is even more evident when one or more of the films is or includes a non-thermoplastic material that crystallizes when heated. On the whole, a material that has been heated to the point of crystallinity or that undergoes other significant changes in properties by the application of sealing-level energy thereto, loses much of its strength and pliability, and almost always is reduced in thickness.

When attempting to longitudinally seal such enclosures when they are unusually large or oversized, additional difficulties are caused by the excessive length of such longitudinal seals, often on the order of approximately six feet, which requires a very expensive sealing device having an oversized energy imparting fixture. A serious quality control problem is also presented because of the criticality involved in properly aligning the films on the fixture so that the seal is properly aligned and/or uniformly spaced from the edge of the enclosure and so that no gaps, buckles or folds are formed therealong. Additionally, forming transverse seals near the edge of a multiple part enclosure requires considerable care in alignment which is not conducive to high speed commercial production of such enclosures. Speed is further stifled because each enclosure must be individually aligned and sealed because the sealing fixtures are oriented transverse to the flow of the enclosures, rather than coincidental with the flow.

Also, films of the type that provide excellent fluid barrier properties, such as those that are coextruded with other tougher films, are relatively expensive when compared with tougher films that provide a less desirable fluid barrier. This means that there is an advantage to be gained in minimizing the use of these expensive fluid barrier films and in avoiding the often used approach of simply sealing such films together to provide the desired fluid barrier properties and strength.

These difficulties are brought under control by the present invention which combines the advantageous properties of film sheeting having excellent fluid barrier properties with blown film tubing that is exceptionally tough and relatively inexpensive, while combining the films in a manner that eliminates the need to form a longitudinal seal and that provides an enclosure having an integral, one-piece internal longitudinal wall, the invention including laminating together a sandwich of a film tubing between at least two film sheets.

It is accordingly a general object of this invention to provide an improved multi-layered enclosure.

Another object of the present invention is an improved multi-layered enclosure having both exceptional strength and excellent fluid barrier properties.

Another object of the present invention is to provide an improved oversized multi-layered enclosure that is free of side or longitudinal seals along the length thereof.

Another object of this invention is to provide an improved multi-layered enclosure, pouch or bag that is free of internal seams throughout the longitudinal extent or length thereof.

Another object of this invention is to provide an improved method for providing a tough and high fluid barrier multi-layered enclosure in a fast and continuous manner.

These and other objects of the present invention will become apparent from the following detailed description thereof, taken in conjunction with the accompanying drawings wherein:

FIG. 1 is a perspective view of a multi-layered enclosure according to this invention, which enclosure includes a bottom seal;

FIG. 2 is an exploded perspective view of the multi-layered enclosure of this invention illustrating component parts thereof prior to lamination;

FIG. 3 is a cross-section along the line 3—3 of FIG. 1, illustrating the preferred longitudinal lamination according to this invention;

FIG. 4 is a cross-section along the line 4—4 of FIG. 1, illustrating a sealed end of the multi-layered enclosure;

FIG. 5 is a perspective view illustrating a typical multi-layered enclosure according to the prior art;

FIG. 6 is an exploded perspective view of the enclosure of FIG. 5 prior to sealing;

FIG. 7 is a cross-section along the line 7—7 of FIG. 5, showing its longitudinal seal;

FIG. 8 is a cross-section along the line 8—8 of FIG. 5, showing its end seal; and FIG. 9 is a diagrammatic perspective view of an apparatus for manufacture of the multi-layered enclosure of this invention, illustrating the method of this invention.

A multi-layered enclosure according to this invention, illustrated generally in FIG. 1 at 21, includes a length of extruded film tubing generally indicated at 22, one length of film sheet designated generally as 23, and another length of film sheet generally designated as 24 which are laminated together in accordance with this invention. As can be seen in FIG. 2, showing the components prior to assembly, the length of extruded tubing 22 is a continuous film cylinder that is generally collapsed upon itself in order to provide two generally opposing panels 25 and 26 that are integrally and continuously connected together by longitudinal edges 27 and 28 of the length of tubing 22. In the enclsoure 21, the length of tubing 22 is sandwiched between and laminated to the film sheets 23 and 24, which include longitudinal edge portions 31, 32 and 33, 34, respectively.

The structure of the longitudinal edges of the multi-layered enclosure 21 is illustrated more fully in FIG. 3, from which the relationship and cooperation among the tubing longitudinal edges 27, 28 and the sheet longitudinal edge portions 31, 32 and 33, 34 are illustrated. The multi-layered enclosure 21 includes a laminated edge section 35 that extends longitudinally therealong, and a similar laminated edge section 36 (FIG. 1) extends longitudinally along the opposite end of the enclosure 21. The laminated edge section 35 includes the longitudinal edge portions 31 and 33 that are laminated together in close association with the longitudinal edge 27 of the tubing 22. In the same fashion, the longitudinal edge portions 32 and 34 are laminated together in close association with the longitudinal edge 28 of the tubing 22 to thereby form the longitudinal laminated edge section 36. The laminated edge sections 35 and 36 are structured such that the film sheets 23 and 24 closely overly the tubing 22 and are joined together therewith into the multi-layered enclosure 21 without significantly weakening any portion of the tubing 22 or the film sheets 23 and 24. Enclosure 21 thus includes a continuous longitudinal internal surface 37 that is free of any seams, seam lines or other points of weakness therealong.

When it is desired that the multi-layered enclosure 21 be in the form of a pouch or a bag, same may include one or more generally transverse seals 38 as illustrated in FIGS. 1 and 4. A multi-layered enclosure 21' which includes no transverse seals is illustrated in FIG. 9, which multilayered enclosure 21' can be made into a pouch that is closed at three sides by adding a seal 38 along the bottom thereof, and such a pouch can be closed after same has been filled with products, such a closure typically being along the top edge and taking the form of another generally transverse seal 38.

Typically, such seals 38 are cross seals that are prepared by sealing means typically used in film enclosures, such as a heat seal made by contacting a heated bar with the film material, whereby the film material along the seal 38 is transformed into its molten state in the presence of pressures applied by the bar, whereby the cross-sectional thickness along the seal 38 is reduced and the film materials are allowed to cool into a generally unitary film. As illustrated in FIG. 4, such a seal 38 may lie along the bottom end portion of the multi-layered enclosure 21, whereby the bottom edge portion 41 of the opposing tubing panel 25, the bottom edge portion 43 of the film sheet and the bottom edge portion 44 of the film sheet 24 have been melted down into a seal area 38 that has a cross-sectional thickness less than the combined thicknesses of the edge portions 41, 42, 43 and 44.

The advantages of this invention can be better understood by a consideration of prior art enclosures which are illustrated generally by 51 in FIGS. 5, 6, 7 and 8. Such enclosures 51 include multiple film sheets generally designated at 52 and 53 that include one or more generally transverse seals 54 formed by conventional sealing machinery for thermoplastic materials. Such seals 54 combine the sheets 52 and 53, which may be of the same materials and structure as the sheets 23 and 24, into a unitary seal line having a thickness less than the total thicknesses of the film sheets 52 and 53. Such enclosures 51 also include longitudinal seals 55 and 56 that are substantially the same as the transverse seals 54 and are a generally unitary mass of resin or polymer of the sheets 52 and 53 that have been heated and cooled into a seal line having a thickness less than the combined thicknesses of the length of film sheets 52 and 53.

Such longitudinal seals 55 and 56 present a location of weakness along the longitudinal extent of the enclosure 51 because of their reduced thickness and also because the longitudinal interior surface 57 of the enclosure 51 is not an integral and continuous surface, but instead includes two seams 58 and 59 along which forces within the bag tend to be concentrated in directions that are generally opposite to each other at the location of the seams 58 and 59, which are themselves the thinnest and weakest points along the longitudinal interior surface 57.

Additionally, when, as contemplated, these enclosures 51 are of exceptional size and have longitudinal edges on the order of six feet in length, sealing devices are needed that have sealing fixtures of at least that size in order to accommodate these oversized enclosures. Such large capacity sealing devices are unusually expensive, when compared with more conventionally sized sealing devices capable of cross sealing or transversely sealing these oversized enclosures, usually at the ends thereof. In the enclosures 51, the seals 55 and 56 are made while the enclosure 51 is stationary and the entire seal 55 or 56 is made at substantially the same time, which requires simultaneous alignment of the lengths of film sheets 52 and 53 along the entire lengths of their respective longitudinal edges within the sealing fixture of the sealing device. This is a batch-type of production that is time consuming and that requires a burdensome quality control program.

The enclosures 21 according to the present invention are, as illustrated in FIG. 9, made in a continuous, longitudinal manner during which the laminated edge sections 35 and 36 are formed at the same time that the film sheets 23 and 24 are laminated to the extruded tubing. By this procedure, it is possible to produce the laminated edge sections 35 and 36 to practically unlimited lengths and to produce the enclosures as a continuous roll which can be subsequently cut to any desired length in order to form the multi-layered enclosures 21', to which one or more transverse seals 38 may be added in order to form the multilayered enclosures or pouches 21. Such a continuous process is significantly faster than and eliminates the careful alignment of each enclosure needed for the batch type of operation needed to seal the longitudinal edges of products such as the enclosures 51 illustrated in FIGS. 5 through 8.

With more particular reference to the method and apparatus illustrated in FIG. 9, multiple webs of film are fed to a lamination means 61, which is of a construction described in Vilutis U.S. Pat. No. 3,329,549, incorporated by reference hereinto. The lamination means 61 includes at least three web-receiving shafts 62, 63 and 64 which guide and/or supply the webs of film material, which may be either extruded on the premises or provided as a rolled finished web of single-ply film or multiple-ply coextruded film. Whether the film is made on the premises or not, two basically different types of film webs are fed through the lamination means 61. The center web 22' is a web of extruded film tubing collapsed upon itself, while the outer webs, or top web 23' and bottom web 24' which sandwich the tubing web 22' therebetween, are extruded in sheet form.

The extruded tubing web 22' is typically made on a blown film apparatus 65 which produces a continuous extruded tubular web 22', such apparatus 65 being of conventional construction. Blown film tubing web 22' is a relatively inexpensive film that is either single ply or double ply, since coextruded blown films of greater than two plies are typically not available. Generally speaking, blown films also bring with them the advantages of being exceptionally tough because their molecular structure is reoriented as the film is manufactured. Many blown films are of the polyolefin type, such as polypropylene and polyethylene whether of low, medium or high density. Also suitable are ethylene vinyl acetate copolymers, polyamides, modified polymers such as polyethylene modified with polyisobutylene, a coextrusion of a polyolefin and ethylene vinyl acetate, a polyethylene terephthalate, and Surlyn tubing. Typically, any blown film material is suitable.

Each film sheet web 23' and 24' is extruded in sheet form, typically through a slot-type of die 69. This type of sheet film brings with it the advantage of providing the capability of multiple-ply sheets that include sheets made of dissimilar materials. This permits the use of films that have exceptional fluid barrier properties, when desired, such as oxygen barrier properties, but which films may be relatively weak or difficult to bond to other materials, in combination with stronger or more readily bonded material that may provide poor barrier properties. Such multiple-ply sheet films are coextruded to form a unitary sheet that is actually composed of multiple plies, typically of dissimilar materials. In general, any type of film sheet is useful in this regard. Exemplary of this type of sheet film is Saranex film (trademark of The Dow Chemical Company), which is especially suitable for the film sheets 23, 23', 24, 24' in that it provides an excellent oxygen barrier and forms a very satisfactory laminate with blown films.

Although such sheet films can, theoretically, include substantial numbers of plies, the readily available multiple-ply films of this type are three-ply or five-ply. For example, a crystalline copolymer of vinylidene chloride and vinyl chloride, the polymer being known as saran, can be integrally sandwiched between outer layers of low density polyethylene, which products are layered and extruded as a single film without orientation. In this exemplified case, the internal, sandwiched layer is a high fluid barrier film, which is sandwiched between and protected by tough, extensible polyethylene films, often with an ethylene vinyl acetate film between the center film and both of the outer layers. Usually, it is especially advantageous if these multiple-ply films are formable, flexible, heat-sealable, printable, and exhibit low shrink as well as high fluid barrier properties. The exemplified film is approved for use in connection with food and drug products. The sheet films should be capable of lamination with a variety of other sheets and foils. These types of coextruded sheet films tend to be relatively expensive and weaker than oriented blown films.

Lamination means 61 is especially designed to laminate, but not seal, the film sheet webs 23' and 24' to the tubing web 22'. As described in U.S. Pat. No. 3,329,549, the laminating means 61 includes a tension lever for squeezing out the air in between the layers to be laminated, which, in effect, eliminates the gaseous barrier between the layers to be laminated together, with the result that only very slight pressure is needed to effect the lamination and to adhere the materials together without appreciably changing the structure or the thickness of the layers being laminated together. Lamination of the internal surface of the web of tubing to itself is avoided by any one of a number of conventional types of procedures such as utilizing tubing having an inner ply that does not readily adhere to itself under lamination conditions, by treating the inside surface of the tubing and/or by adjusting the laminating means.

A laminated web 66 exits the lamination means 61 and passes along a tension maintaining means 67, which may be an idler roller, and unwind shaft, a rewind shaft or the like, depending upon whether or not the web 66 is to be wound as a final or intermediate product. When enclosures of a particular length are desired, the laminated web 66 passes through a cutting means 68 by which the laminated web 66 is cut into multi-layered enclosures of any desired length. Thereafter, one or more generally transverse seals 38 can be formed along the multi-layered enclosure 21' by conventional means to provide a seal that may be of the thermal, ultrasonic, impulse or adhesive type or the like, or combinations thereof.

The method according to this invention includes selecting a length of extruded tubing, most advantageously in the form of continuous extruded web, such web having two longitudinal edges that are integral and continuous with the web, this tubing being of the blown-film variety which has typically been reoriented for enhanced toughness. A length of film sheet, again preferably in the form of a continuous web, is juxtaposed in overlying relationship with one outside face of the tubing, and another film sheet is juxtaposed to overlie the other outside face of the tubing in order to form a sandwich of collapsed tubing in between the two webs of sheet tubing. The sheet film is preferably a coextrusion including an excellent fluid barrier film protected by a tougher film having good adherence properties.

Next, the sandwich is subjected to laminating conditions such that the one film sheet is adhered to the one outside surface of the tubing and the other film sheet is adhered to the other outside surface of the tubing and such that the inside surface of the tubing is not laminated to itself, in order to provide a unitary enclosure.

The laminated product thus formed is a sandwich in which the portions of the sandwich are laminated but not sealed together, which results in a product of increased overall strength when compared with a similar product in which the same materials are coextruded together. One of the advantageous attributes of the lamination is that the films laminated together are able to move somewhat with respect to each other to thereby increase the strength of the overall composite product, because the tougher tubing layer generally retains its own strength. If the same inner tubing and the same outer sheet films were coextruded, the weaker outer webs would weaken the inner tubing web.

When it is desired to prepare a pouch or the like that is closed on three or more edges or that includes multiple pockets, a generally longitudinal seal or cross-seal can be formed on the laminated multi-layered enclosure or web by any one of a number of conventional sealing methods or combinations thereof. Such cross-seals are made in a manner that is different from the high-speed sandwich lamination characteristic of the laminating step.

Products according to this invention are especially suitable for selecting webs in order to prepare exceptionally tough bags of very large capacity, such as those used in connection with the processing and storage of food products, such as bulk cheese products, meats and boxed primal cuts where exceptionally long shelf life is needed in combination with strength required for containing such bulky and sometimes non-uniformly shaped products. While a typical coextruded, multi-layered container such as that illustrated in FIGS. 5 through 8 exhibits a fluid barrier permitting the passage of about 2 cubic centimeters of oxygen per 24 hours of storage at 100% humidity, enclosures according to this invention that are prepared as a tough, barrier container permit the passage of only about 0.75 cubic centimeters of oxygen per 24 hours at 100% humidity which provides a barrier suitable for cold storage for up to two years.

It will be apparent to those skilled in this art that the present invention can be embodied in various additional forms; accordingly, this invention is to be construed and limited only by the scope of the appended claims.

I claim:

1. A multi-layered enclosure, comprising:
   a length of collapsed extruded tubing having two panels integral with each other, said panels being integrally joined along two common longitudinal edges that are continuous with both of said two tubing panels;
   one length of extruded sheeting having two longitudinal edges complementary to said tubing longitudinal edges, said one length of sheeting overlying one of said tubing panels;
   another length of extruded sheeting having two longitudinal edges complementary to said tubing longitudinal edges, said another length of sheeting overlying the other of said two tubing panels; and
   said length of extruded tubing, said one length of extruded sheeting and said another length of extruded sheeting are laminated to each other into a multi-layered enclosure in which said one length of sheeting is laminated to substantially the entire outside surface of said one tubing panel, in which said another length of sheeting is laminated to substantially the entire outside surface of said other tubing panel, in which one of said two longitudinal edges of the one length of sheeting is laminated to one of said two longitudinal edges of the another length of sheeting to form one longitudinal edge section, and in which the other of said two longitudinal edges of the one length of sheeting is laminated to the other of said two longitudinal edges of the another length of sheeting to form another laminated edge section.

2. The multi-layered enclosure of claim 1, wherein said one laminated edge section is adjacent one of said two common longitudinal edges of the extruded tubing and wherein said another laminated edge section is adjacent the other of said two common longitudinal edges of the extruded tubing.

3. The multi-layered enclosure of claim 1, wherein said enclosure has a continuous, seam-free internal surface.

4. The multi-layered enclosure of claim 1, wherein said length of tubing is a blown film of a molecular structure that had been reoriented during extrusion thereof in order to enhance its strength.

5. The multi-layered enclosure of claim 1, wherein said length of tubing is high density polyethylene.

6. The multi-layered enclosure of claim 1, wherein said extruded sheeting is a sheet coextrusion of multiple plies of dissimilar materials, at least one of said materials providing a high oxygen barrier.

7. The multi-layered enclosure of claim 1, wherein said extruded sheeting is a sheet coextrusion of an outer ply of readily laminated material, an inner ply of a high oxygen barrier, and another outer ply of readily laminated material.

8. The multi-layered enclosure of claim 1, wherein said extruded sheeting is a sheet coextrusion of an outer ply of readily laminated material, an intermediate ply of material exhibiting cohesive properties, an inner ply of a high oxygen barrier material, another intermediate ply of cohesive material, and another outer ply of readily laminated material.

9. The multi-layered enclosure of claim 7, wherein each of said outer plies is a low density polyethylene material and wherein said inner ply is a vinylidine chloride copolymer.

10. The multi-layered enclosure of claim 1, further including a generally transverse seal between said one laminated edge section and said another laminated edge section.

11. A multi-layered pouch comprising:
    a length of extruded tubing having two panels integral with each other, each panel having a bottom edge, a top edge, a first longitudinal edge and a second longitudinal edge, each of said first and second longitudinal edge extending between said top edge and said bottom edge of the length of tubing;
    one length of sheet film having a bottom edge, a top edge and two longitudinal edges, each of said longitudinal edges extending between said top edge and said bottom edge, said one length of sheet film overlying one of said tubing panels;
    another length of sheet film having a bottom edge, a top edge and two longitudinal edges, each of said longitudinal edges extending between said top edge and said bottom edge, said another length of sheet film overlying the other of said tubing panels;
    said length of extruded tubing, said one length of sheet film and said another length of sheet film are laminated to each other into a multi-layered pouch in which said one length of sheet film is laminated to substantially the entire outside surface of said one tubing panel, in which said another length of sheet film is laminated to substantially the entire outside surface of said other tubing panel, in which one of said two longitudinal edges of the one length of sheet film is laminated to one of said two longitudinal edges of the another length of sheet film to form one pouch laminated edge section, and in which the other of said two longitudinal edges of the one length of sheet film is laminated to the other of said two longitudinal edges of the another length of sheet film to form another pouch laminated edge section; and each of said bottom edges of the tubing panels, the bottom edge of said one length of sheet film and the bottom edge of said another length of sheet film are sealed together to form a closed seam of said multi-layered tube that is generally transverse to and that extends between said one pouch laminated edge section and said another pouch laminated edge section.

12. The multi-layered pouch of claim 11, wherein said one pouch laminated edge section is adjacent said first longitudinal edge of the tubing and wherein said another pouch laminated edge section is adjacent said second longitudinal edge of the tubing.

13. The multi-layered pouch of claim 11, wherein said pouch has a continuous, seam-free internal longitudinal surface.

14. The multi-layered pouch of claim 11, wherein said length of tubing is a blown film and wherein said sheet film is a multiple-ply sheet coextrusion.

15. The multi-layered pouch of claim 11, wherein said sheet film is a sheet coextrusion of an outer ply of readily laminated material, an inner ply of high oxygen barrier, and another outer ply of readily laminated material.

16. A multi-layered enclosure made by a process comprising:

selecting a length of extruded tubing having two panels integral with each other, said panels being integrally joined along two longitudinal edges that are continuous with both of said two tubing panels;

juxtaposing one length of film sheeting in overlying relationship to one of said tubing panels, said one length of film sheeting having two longitudinal edges complementary to said tubing longitudinal edges;

juxtaposing another length of film sheeting in overlying relationship to the other of said tubing panels, said another length of film sheeting having two longitudinal edges complementary to said tubing longitudinal edges; and laminating together each of said length of extruded tubing, said one length of film sheeting and said another length of film sheeting to form a multi-layered enclosure, said laminating step including laminating said one length of film sheeting to substantially the entire outside surface of one of said tubing panels, laminating said another length of film sheeting to substantially the entire outside surface of the other of said tubing panels, laminating one of said two longitudinal edges of the one length of film sheeting to one of said two longitudinal edges of the another length of film sheeting in order to form a first laminated edge section, and laminating the other of said two longitudinal edges of the one length of film sheeting to the other of said two longitudinal edges of the another length of film sheeting in order to form a second laminated edge section.

17. The enclosure of claim 16, wherein said laminating step aligns said first laminated edge section adjacent to one of said longitudinal edges of the tubing and wherein said laminating step aligns said second laminated edge section adjacent to the other of said longitudinal edges of the tubing.

18. The enclosure of claim 16, wherein said laminating step adheres the tubing, the length of film sheeting and the another length of film sheeting together while avoiding any significant change in the structure or the thickness of the tubing or the lengths of film sheeting.

19. The enclosure of claim 16, wherein said laminating step precludes lamination of the internal surfaces of said two tubing panels.

20. The enclosure of claim 16, wherein said length of extruded tubing has a bottom edge extending between said two longitudinal edges thereof, said one length of film sheeting has a bottom edge extending between the two longitudinal edges thereof, and said another length of film sheeting has a bottom edge extending between the two longitudinal edges thereof, further including;

forming a seal along said tubing bottom edge, said one length of film sheeting bottom edge and said another length of film sheeting bottom edge in order to join said bottom edges together into a bottom seal of the multi-layered enclosure.

* * * * *